(12) United States Patent
Takeda

(10) Patent No.: US 7,920,236 B2
(45) Date of Patent: Apr. 5, 2011

(54) LIQUID CRYSTAL DISPLAY DEVICE

(75) Inventor: Shintaro Takeda, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 126 days.

(21) Appl. No.: 12/314,725

(22) Filed: Dec. 16, 2008

(65) Prior Publication Data
US 2009/0190085 A1 Jul. 30, 2009

(30) Foreign Application Priority Data

Dec. 19, 2007 (JP) ................................. 2007-326661

(51) Int. Cl.
*G02F 1/1343* (2006.01)
*C09K 19/52* (2006.01)
*C09K 19/54* (2006.01)

(52) U.S. Cl. ..................... 349/116; 428/1.1; 252/299.01; 252/299.5; 977/742

(58) Field of Classification Search ............. 252/299.01, 252/299.5; 428/1.1; 349/166; 977/742
See application file for complete search history.

(56) References Cited

FOREIGN PATENT DOCUMENTS
JP 2006-291016 10/2006

OTHER PUBLICATIONS

"Chemistry of Liquid Crystal", Edited by The Chemical Society of Japan, p. 46, 1994, With English Translation.
Jeon et al., "Effects of Carbon Nanotubes on Electro-Optic Characteristics of TN-LC Cells", Collection of Abstracts for IDW by Sang Youn Jeon et al., pp. 167-170, 2005.
Woltman et al., "P-119: $^2$H-NMR Study of Nanohorn Doped Liquid Crystals for Improved Dynamic Response in Liquid Crystal Displays", SID Digest by Scott J. Woltman et al., pp. 752-755, 2005.
Junji Mukai et al., "Polymer with Practical Applications for Engineers", Kodansha Scientific, p. 71-77, 1981.
Liquid Crystal Handbook, edited by Editorial Committee for Liquid Crystal Handbook, pp. 324-329, 2000.
Basic Studies and New Developments in Liquid Crystal Materials, edited by Study Group of Young Liquid Crystal Researchers, pp. 106-109, 1998.
Increasing Dispersion and Conductivity of Carbon Nanotubes, by Masato Sano, pp. 15 to 17, 2006.
Increasing Dispersion and Conductivity of Carbon Nanotubes, by Kazuyuki Taji, pp. 14 to 21, 2006.

*Primary Examiner* — Shean C Wu
(74) *Attorney, Agent, or Firm* — Antonelli, Terry, Stout & Kraus, LLP.

(57) ABSTRACT

An object of the present invention is to reduce defects in display due to short-circuiting in liquid crystal display devices using a liquid crystal material containing organic particles having anisotropy in a uniaxial form. The present invention provides a liquid crystal display device with: a first substrate; a second substrate; and a liquid crystal layer, a pixel electrode and a common electrode placed between the above described first substrate and the above described second substrate, wherein the above described liquid crystal layer contains a number of organic particles having anisotropy in a uniaxial form, and the longitudinal axis of the particle having the longest longitudinal axis from among the above described particles is no greater than the thickness of the above described liquid crystal layer or the distance between the above described pixel electrode and the above described common electrode—whichever is shorter.

10 Claims, 11 Drawing Sheets

LIQUID CRYSTAL DISPLAY DEVICE

The present application claims priority over Japanese Application JP2007-326661 filed on Dec. 19, 2007, the contents of which are hereby incorporated into this application by reference.

BACKGROUND OF THE INVENTION (1) Field of the Invention

The present invention relates to a liquid crystal display device.

(2) Related Art Statement

As a result of progress in technology for manufacturing liquid crystal panels in recent years, liquid crystal display elements have been used as displays for televisions, the majority of which were conventionally cathode ray tubes. Twisted nematic (TN) mode display systems are known as conventional liquid crystal display elements, and in these systems, it has been an object to improve the contrast, view angle properties and response (=response time). In particular, the response, which is a factor dominating the quality of moving images, is inferior to that of cathode ray tubes when applied to televisions, and thus, improvement has been strongly desired.

Concerning the response, it is known, as described in Non-Patent Document 1, that the viscosity and the elastic constant of the liquid crystal material are control factors. Meanwhile, it is necessary for such parameters as anisotropy in the index of refraction, which are optical properties, nematic-isotropic transition temperature, which are temperature properties, and anisotropy in the dielectric constant, which are electrical properties, to be balanced when a liquid crystal material is used for a display. However, when any one parameter is changed, other parameters may also change. Therefore, it becomes very difficult to adjust the balance with other parameters when the viscosity or elastic constant is changed greatly in order to improve the response.

So far it has only been possible to improve the response by improving the display system and the drive system, in addition to the viscosity and the elastic constant. In recent years, however, it has been reported that the response can be improved by adding nanoparticles to liquid crystal as non-liquid crystal components. For example, the results of improvement in the response time of liquid crystal display devices by adding a material having anisotropy in the uniaxial form to liquid crystal have been reported as organic nanoparticles, as in Non-Patent Documents 2 and 3.

(Non-Patent Document 1) Chemistry of Liquid Crystal, Edited by The Chemical Society of JAPAN, p. 46, 1994

(Non-Patent Document 2) Collection of Abstracts for IDW by Sang Youn Jeon et al., pp. 167-170, 2005

(Non-Patent Document 3) SID Digest by Scott J. Woltman et al., pp. 752-755, 2005

SUMMARY OF THE INVENTION

Problem to be Solved by the Invention

Though the properties of liquid crystal to which nanoparticles are added, which are different from those in conventional liquid crystal, have been disclosed, as described above, the characteristics required in the structure and material of devices to which such a liquid crystal material is applied have not been sufficiently examined.

Organic materials having anisotropy in uniaxial form are conductive, and therefore, such problems as defects in display resulting from electrical short-circuiting may arise, depending on the length. In addition, organic materials having anisotropy in uniaxial form have high crystallinity on the surface, and therefore easily aggregate spontaneously, and the aggregated material causes short-circuiting, and thus, such problems as defects in display arise.

An object of the present invention is to provide a nanoparticle material which does not cause defects in display resulting from short circuiting in liquid crystal display devices.

Means for Solving Problem

The present invention is characterized in that a liquid crystal layer, a pixel electrode and a common electrode are provided between a first substrate and a second substrate, the liquid crystal layer contains organic particles having anisotropy in the uniaxial form, and the longitudinal axis of the particles is not longer than the thickness of the liquid crystal layer or the distance between the above described pixel electrode and the above described common electrode—whichever is shorter.

Effects of the Invention

Liquid crystal display panels and liquid crystal display devices having high-speed response can be implemented.

EXPLANATION OF SYMBOLS

PX pixel electrode
CT common electrode

CL common signal line
GL gate signal line
TFT thin film transistor
DL video signal line
CF color filter
SUB1, SUB2 substrate
PL1, PL2 polarizing plate
PAS passivation film
EL electrical field
LC liquid crystal layer
OC overcoat film
LB liquid crystal dish
LCD display device
SI sealing material
D thickness of liquid crystal layer
L distance between electrodes

DETAILED DESCRIPTION OF THE INVENTION

In the following, the embodiments of the present invention are described in detail.

First Embodiment

Figure 1:
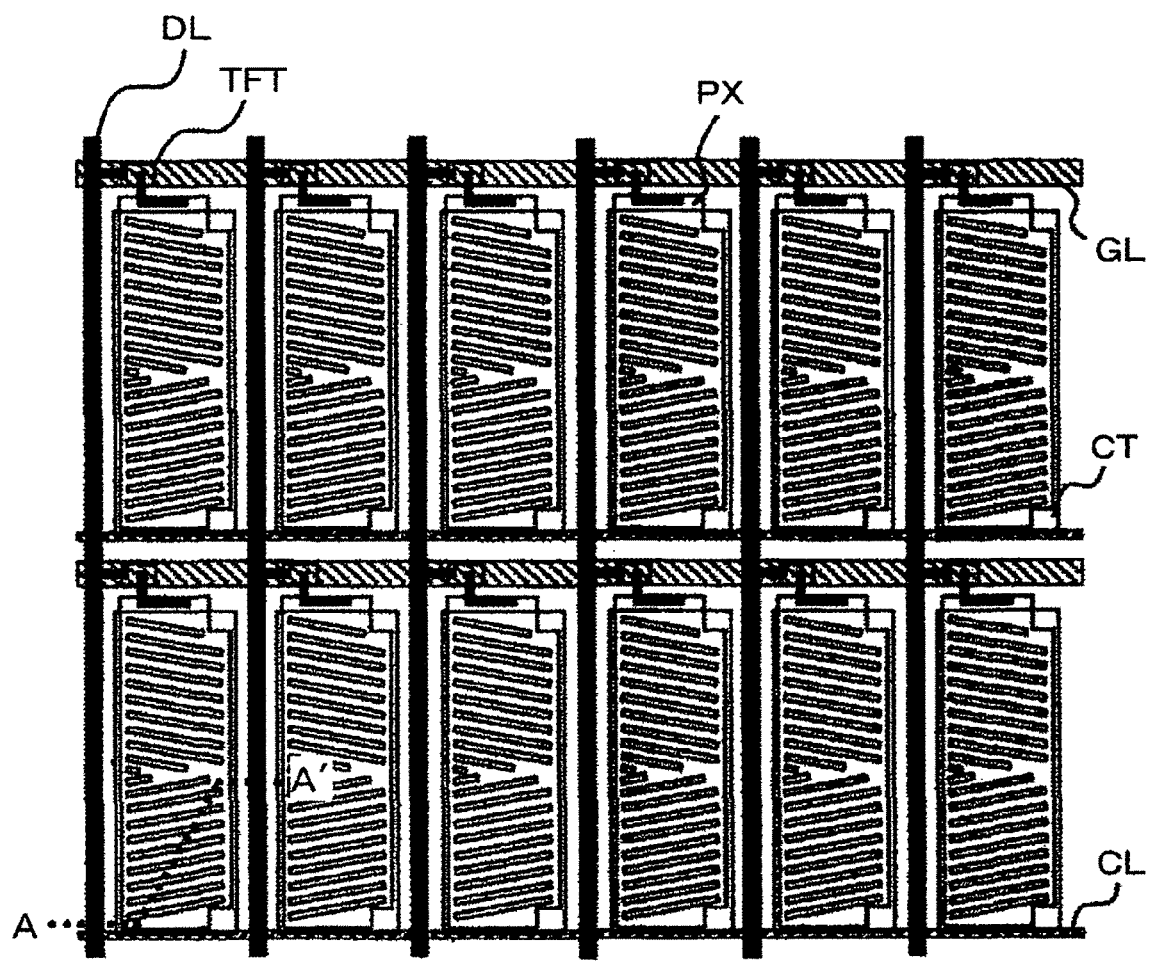
FIG. 1 is a diagram showing an example of the configuration of the device according to the first embodiment of the present invention.

FIG. 1 shows an example of the configuration of a group of pixels within a display element. A video signal from a video signal line DL is supplied to a pixel electrode PX via a thin film transistor TFT controlled by a gate signal line GL. An electrical field is generated between this pixel electrode PX and a common electrode CT so that a liquid crystal layer is controlled, and thus, an image is displayed.

Figure 2:
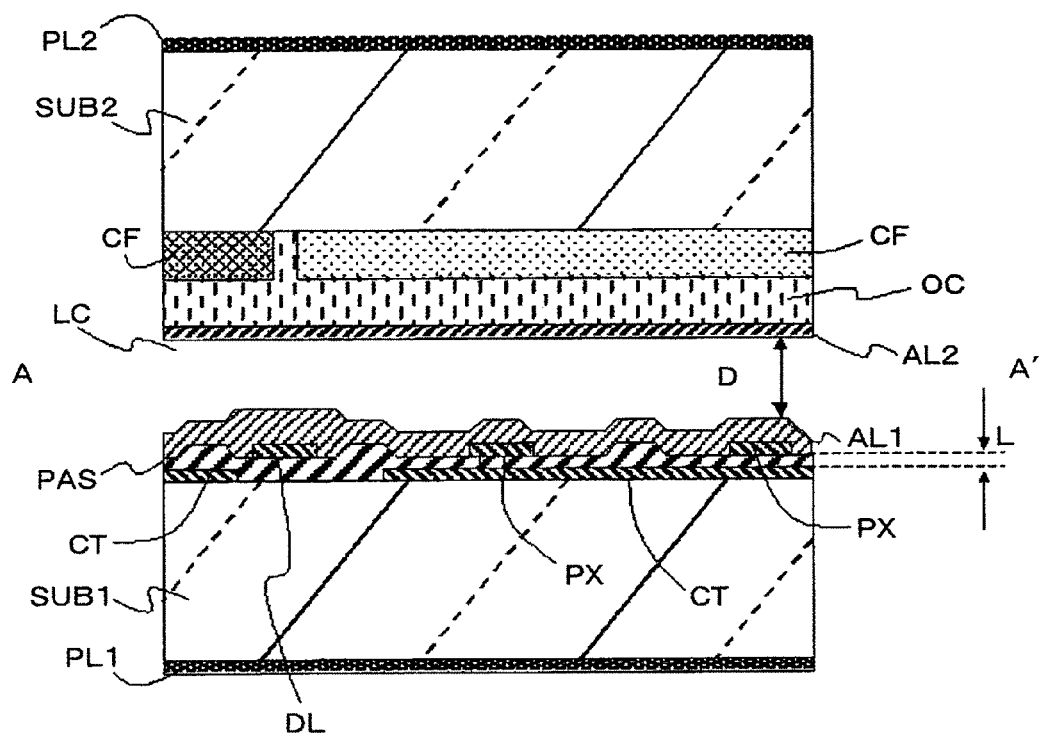
FIG. 2 is a diagram showing an example of the configuration of the device according to the first embodiment of the present invention.

FIG. 2 is a cross sectional diagram along line A-A' in FIG. 1. Color filters CF have different colors in pixels adjacent in the lateral direction and display different colors. Meanwhile, the substrate SUB1 on the lower side has common electrodes CT formed on a flat plate for each pixel. A passivation film PAS is provided over the common electrodes CT, and video signal lines DL are provided so as to correspond to the spaces between the common electrodes CT for each pixel. Furthermore, the passivation film PAS is provided over these video signal lines, and pixel electrodes PX are provided on top of this. The common electrodes CT are transparent elements for display formed of transparent electrodes, such as of ITO. In the present embodiment, two transparent glass substrates having a thickness of 0.7 mm are used as the substrates. On one of these substrates SUB1, thin film transistors TFT, gate signal lines GL and video signal lines DL are formed. Here, any matrix element made of a thin film transistor and wire electrodes may be used, as long as it can control a general active matrix.

In the display region of a pixel, a solid common electrode CT is formed as a layer above the substrate SUB1 as a transparent conductive layer made of ITO (indium tin oxide), and furthermore, a passivation film PAS of silicon nitride is formed on top of this. In the present embodiment, the film thickness of the solid common electrode CT made of ITO and the passivation film PAS is 550 nm.

Next, a pixel electrode PX in comb-like form is formed on top of the passivation film PAS as an ITO electrode layer having a film thickness of 77 nm. The distance L between the pixel electrode PX and the common electrode CT is 5 μm. Here, L in the present embodiment is the distance the pixel electrode PX and the common electrode CT in the direction of the normal to the surface of the substrates.

Color filters CF and an overcoat film OC are formed on the other substrate SUB2. An orientation film AL made of polyimide is formed on top of this, and after that, a rubbing process is carried out. The rubbing is carried out in the direction parallel to the gate signal lines GL in FIG. 1. Furthermore, spacers in column form (4 microns) are formed on SUB2, and a sealing agent is formed in the outer periphery portion of the substrate SUB1.

Figure 3A:
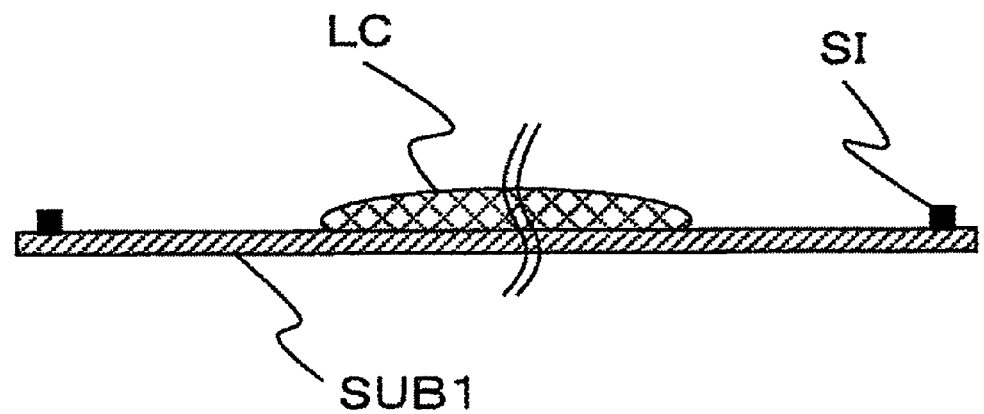
FIG. 3a is a diagram illustrating a method for injecting a liquid crystal material into a liquid crystal display device according to the first embodiment.
Figure 3B:
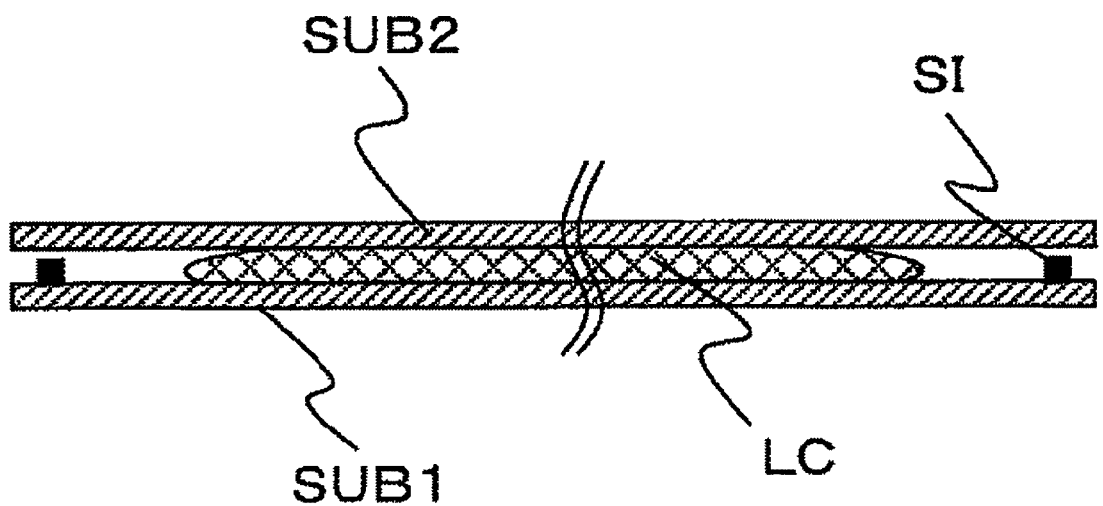
FIG. 3b is a diagram illustrating a method for injecting a liquid crystal material into a liquid crystal display device according to the first embodiment.

Next, the liquid crystal used for the liquid crystal layer LC is prepared. First, $10^{-3}$ wt % of carbon nanotubes having an average length of 500 nm in the longitudinal direction, for example, (made by Aldrich Inc.) is added to liquid crystal (ZLI 4792, made by Merck Ltd.), which becomes a matrix. In order to disperse the carbon nanotubes uniformly throughout the liquid crystal, the liquid crystal is vibrated for approximately 6 hours using an ultrasonic cleaner. Furthermore, this liquid crystal passes through a membrane filter where the diameter of pores is 0.5 μm. After that, as shown in FIG. 3a, a necessary amount of supernatant of the liquid crystal in which the carbon nanotubes are dispersed is dropped onto the substrate SUB1 under reduced pressure, and the substrates SUB1 and SUB2 are layered, pressed against each other and combined without bubbles in between, so that the surface of the orientation film AL on the substrate SUB1 and the surface of the orientation film AL on the substrate SUB2 face each other, and the direction of rubbing for the substrates SUB1 and SUB2 are the same, as shown in FIG. 3b.

Next, this panel is sandwiched between two polarizing plates PL1 and PL2 (SEG 1224DU, made by Nitto Denko Corporation), and placed so that the polarized transmission axis of one polarizing plate crosses that of the other at a right angle. At this time, the polarizing transmission axis of the polarizing plate PL1 forms 0 degrees with the direction in which the substrates SUB1 and SUB2 are rubbed, and that of the polarizing plate PL2 forms 90 degrees.

Next, a driving circuit is connected so that an alternating driving voltage can be applied across the above described pixel electrode PX and the common electrode CT, and after that, a backlight and the like are connected to the whole, and thus, a liquid crystal display device is gained as a module.

The carbon nanotubes used in the present embodiment have anisotropy in uniaxial form and are cylindrical in form, with an average length of the longitudinal axis of 0.5 μm and a diameter of 1 nm to 2 nm. In addition, the liquid crystal in which these are dispersed passes through a filter where the diameter of pores is 0.5 μm, and thus, the length of the carbon nanotubes along the longitudinal axis becomes 0.5 μm or less. This is sufficiently short relative to the thickness D of the liquid crystal layer and the distance L between the pixel electrode PX and the common electrode CT, and thus, no defects caused by short-circuiting of carbon nanotubes can be observed. In addition, there is very little change in the display properties due to increase in the thickness of the liquid crystal layer caused by carbon nanotubes or aggregation thereof, and thus, excellent display can be achieved.

Here, excellent display can be achieved using any material having anisotropy in the uniaxial form other than carbon nanotubes. The structure and aggregation of molecules having anisotropy in the uniaxial form include "rod form," "columnar form," "cylindrical form" and "fiber form," and as examples of these structures, columnar micell structure formed of amphiphile molecules, hollow fiber like organic nanotube, glucosamine based polymer nanotubes, phenol based polymer nanotubes and tobacco mosaic viruses can be cited, but the structure is not limited to these.

The length of the carbon nanotubes used here along the longitudinal axis is 0.5 μm, and this is an average length for the longitudinal axis, and in reality carbon nanotubes shorter than 0.5 μm are included. In the case where the material having anisotropy in the uniaxial form includes a material where the length of the longitudinal axis is no greater than the thickness of the liquid crystal layer or the distance between the pixel electrode and the common electrode—whichever is shorter—the effects of the present invention can be gained. In addition, in the case where only the material having anisotropy in the uniaxial form where the length of the longitudinal axis is no greater than the thickness of the liquid crystal layer or the distance between the pixel electrode and the common electrode—whichever is shorter—is included, the same effects can be expected.

Second Embodiment

Figure 4:
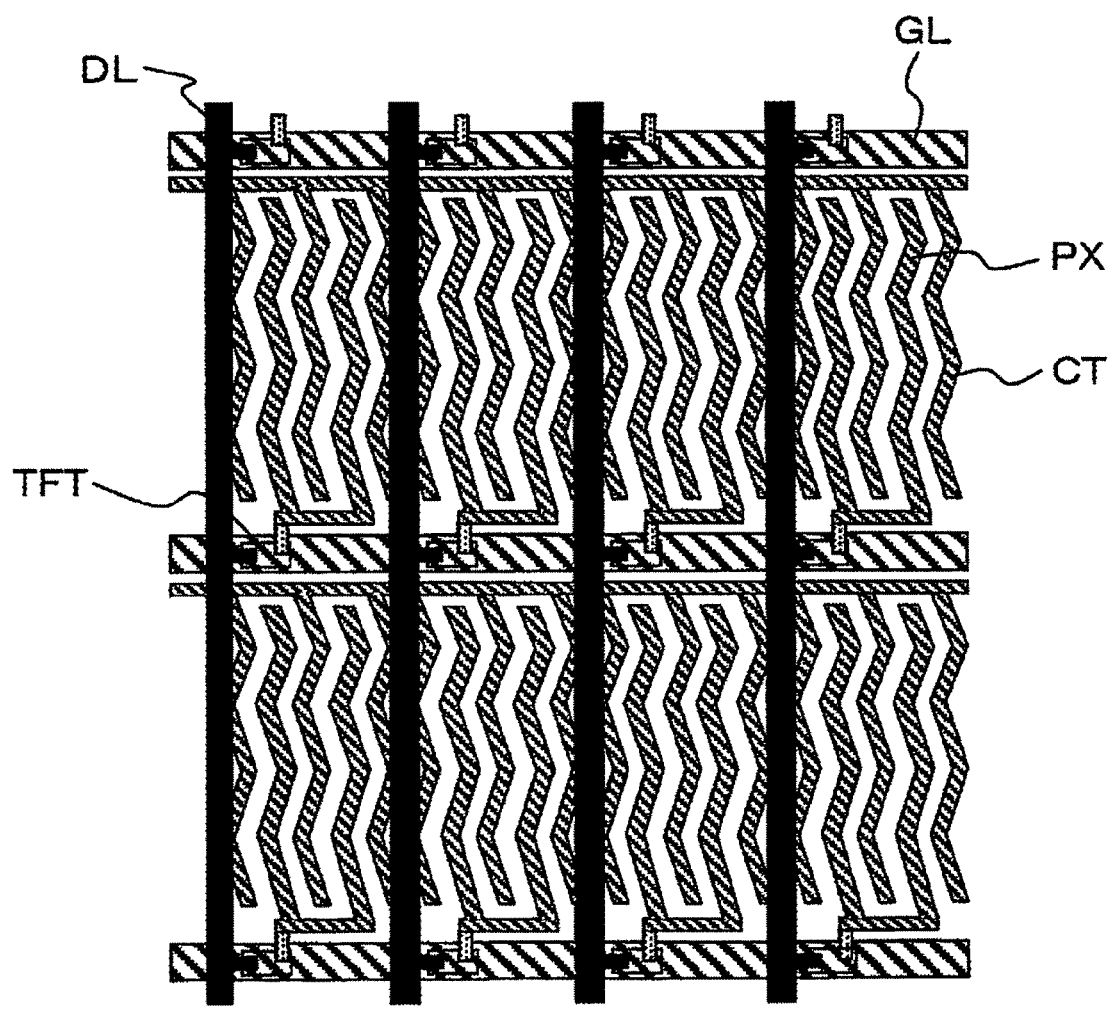
FIG. 4 is a diagram showing an example of the configuration of the device according to the second embodiment of the present invention.
Figure 5:
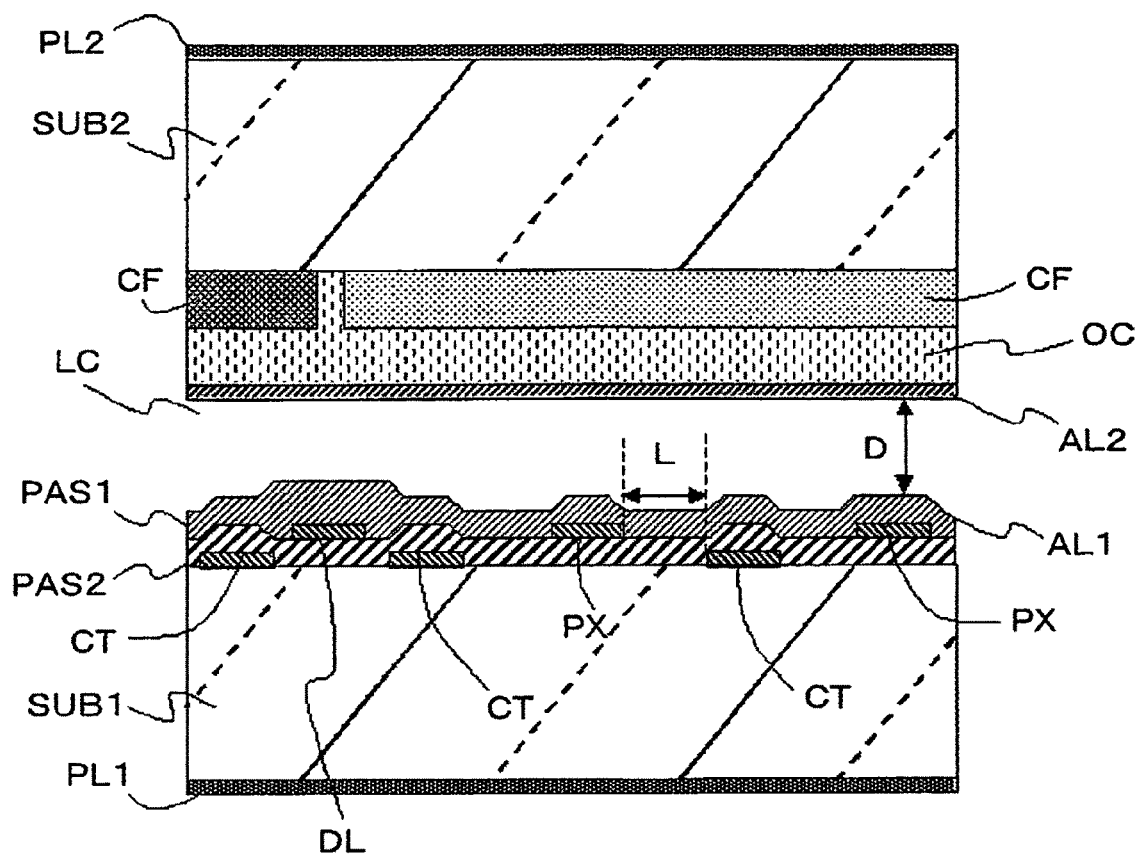
FIG. 5 is a diagram showing an example of the configuration of the device according to the second embodiment of the present invention.

FIG. 4 shows an example of the configuration of a group of pixels within the display element according to an embodiment which is different from the first embodiment of the first invention. A video signal of a video signal line is supplied to a pixel electrode PX via a thin film transistor TFT controlled by a gate signal line GL. An electrical field is generated between this pixel electrode PX and a common electrode CT, so that a liquid crystal layer is controlled and an image is displayed. FIG. 5 is a cross sectional diagram along line B-B' in FIG. 4. The configuration shown in these figures is approximately the same as in the first embodiment, but different in that the pixel electrode PX and the common electrode CX are both formed in comb form. This structure is formed on the substrates SUB1 and SUB2. At this time, both the pixel electrode PX and the common electrode have a width of 7 μm, the distance between the pixel electrode PX and the common electrode is 10 μm, and the passivation film PAS is formed of silicon nitride so as to have a thickness of 500 nm. Here, L in the present embodiment is the distance between the pixel electrode PX and the common electrode CT in the direction in a plane of the surface of the substrates. An orientation film AL made of polyimide is formed on these substrates, and after that, a rubbing process is carried out. The rubbing is carried out in the direction parallel to the video signal line DL in FIG. 4. Furthermore, spacers in columnar form (4 microns) are formed on the substrate SUB2, and in addition, a sealing agent with an opening for injecting liquid crystal is formed in the outer peripheral portion of the substrate SUB1, and thus, the substrates SUB1 and SUB2 are combined, so that the orientation films AL face each other and the direction in which the substrates SUB1 and SUB2 are rubbed is the same.

Figure 6:
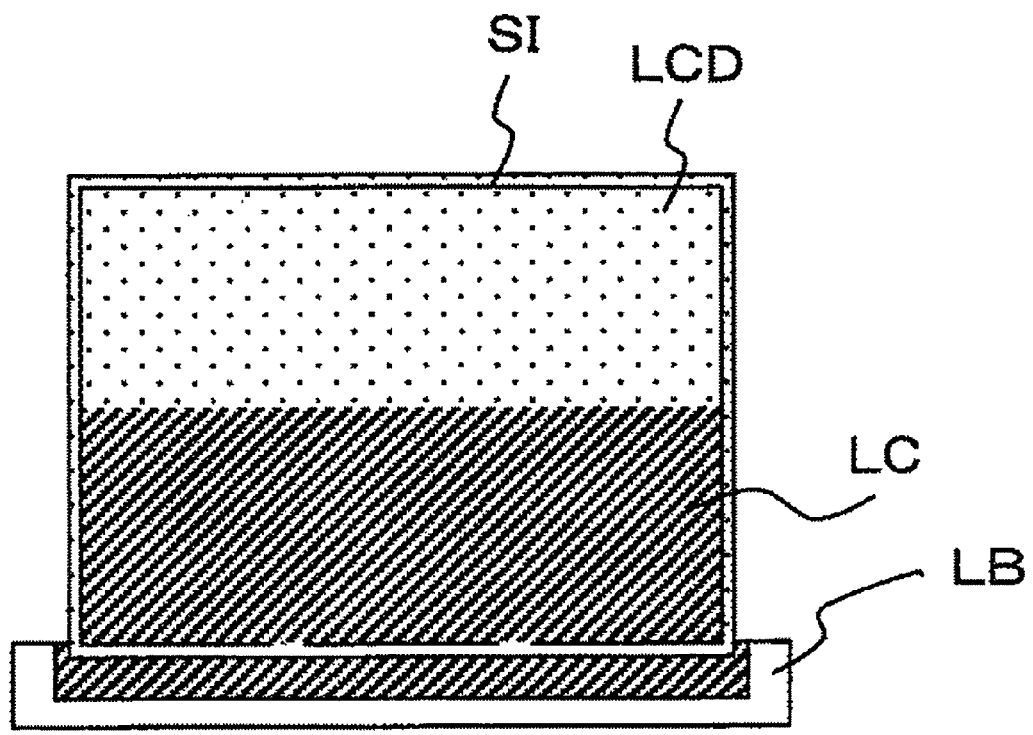
FIG. 6 is a diagram illustrating a method for injecting a liquid crystal material into a liquid crystal display device according to the second embodiment.

Next, as shown in FIG. 6, the opening for injection in the display device LCD assembled in a vacuum chamber is made to make contact with the liquid crystal layer LC stored in a liquid crystal dish LB, and the vacuum chamber gradually returns to normal pressure, so that the liquid crystal is injected. The liquid crystal material used here is the liquid crystal material of the first embodiment, in which carbon nanotubes are dispersed.

Next, this panel is sandwiched between two polarizing plates PL1 and PL2 (SEG 1224DU, made by Nitto Denko Corporation) and the polarizing transmission axis of one polarizing plate is oriented so as to cross that of the other at a right angle. At this time, the polarizing transmission axis of the polarizing plate PL1 forms 0 degrees with the direction in which the substrates SUB1 and SUB2 are rubbed, and that of the polarizing plate PL2 forms 90 degrees.

Next, a driving circuit is connected so that an alternating driving voltage can be applied across the pixel electrode PX and the common electrode CT, and after that, a backlight and the like are connected to the whole, and thus, a liquid crystal display device is gained as a module. The length of the carbon nanotubes along the longitudinal axis is sufficiently short relative to the thickness D of the liquid crystal layer and the distance L between the pixel electrode PX and the common electrode CT, and thus, no defects caused by short-circuiting of carbon nanotubes can be observed, as in the first embodiment. In addition, there is very little change in the display properties due to increase in the thickness of the liquid crystal layer caused by carbon nanotubes or aggregation thereof, and thus, excellent display can be achieved. Here, excellent display can be achieved using any material having anisotropy in the uniaxial form other than carbon nanotubes. The structure and aggregation of molecules having anisotropy in the uniaxial form include "rod form," "columnar form," "cylindrical form" and "fiber form," and as examples of these structures, micelle structures in columnar form formed of amphipathic molecules, organic nanotubes in hollow fiber form, glucosamine based polymer nanotubes, phenol based polymer nanotubes and tobacco mosaic viruses can be cited, but the structure is not limited to these.

Third Embodiment

Figure 7A:
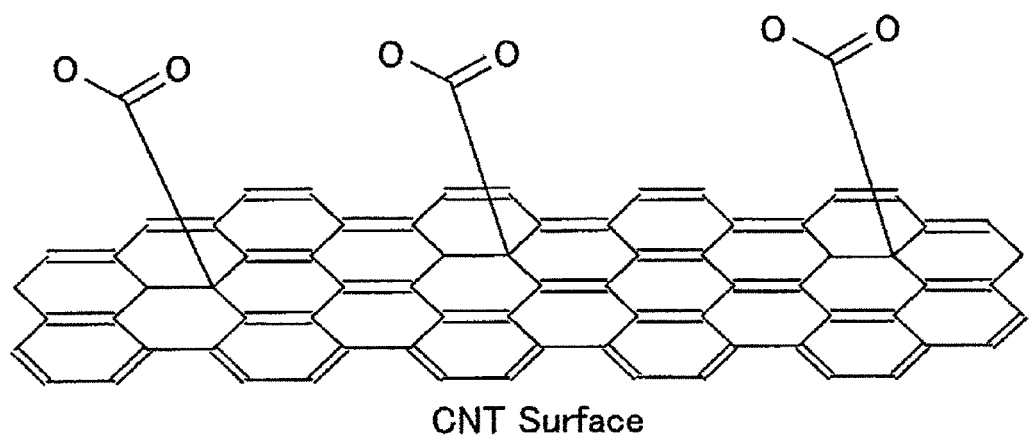
FIG. 7a is a schematic diagram showing the surface of a carbon nanotube used in the third embodiment.
Figure 7B:
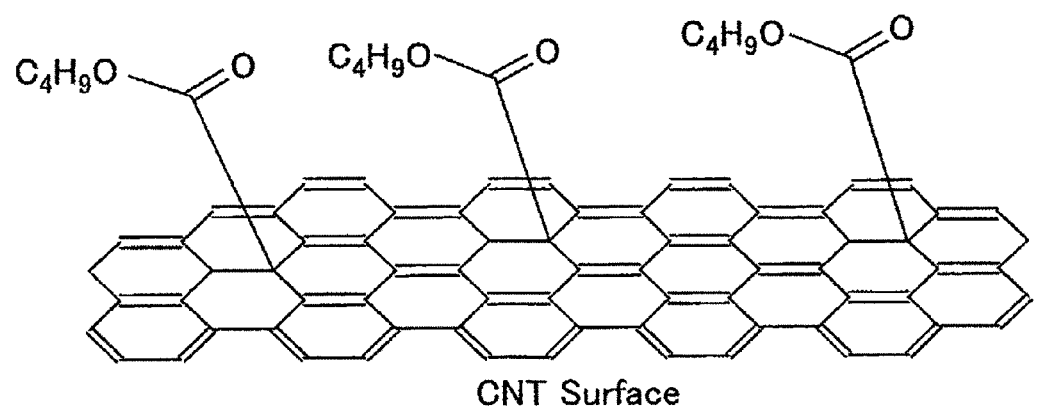
FIG. 7b is a schematic diagram showing the surface of a carbon nanotube used in the third embodiment.

FIG. 7a is a conceptual diagram showing the surface of a carbon nanotube which is chemically modified, available from Aldrich Inc. Carboxyl groups are bonded to the surface through covalent bonding. The solubility parameter of the carboxyl groups on the surface is as found in accordance with the information in Non-Patent Document 4 ("Polymer with Practical Applications for Engineers" by Junji Mukai and Noriyuki Kinjo, Kodansha Scientific, p. 71-77, 1981). The solubility parameter for the general nematic liquid crystal molecules described in Non-Patent Document 5 (Liquid Crystal Handbook, edited by Editorial Committee for Liquid Crystal Handbook, pp. 324-329, 2000) is approximately 8 to 12 as found using this calculation method. On the basis of these results, the compound in FIG. 7b is synthesized from the compound in FIG. 7a and an alcohol (n-propyl alcohol) in the present embodiment) through a general esterification reaction. The compound is gained by removing the solvent through evaporation and dried in a vacuum. The solubility parameter of the molecule group bonded to the surface of the carbon nanotube in FIG. 7b is calculated and found to be 10.0 $(cal/cm)^{0.5}$.

$10^{-3}$ wt % of the thus gained compound in FIG. 7b is added to a liquid crystal composite gained by mixing an equal amount of compound 3 and compound 4 synthesized from compound 1 (made by SiberHegner K. K.) and compound 2 (made by Aldrich Inc.) in reference to Non-Patent Document 6 (Basic Studies and New Developments in Liquid Crystal Materials, edited by Study Group of Young Liquid Crystal Researchers, pp. 106-109, 1998).

The solubility parameters for these compounds are found through calculation in accordance with the above described method: compound 1: 10.1 $(cal/cm)^{0.5}$, compound 2: 11.0 $(cal/cm)^{0.5}$, compound 3: 9.1 $(cal/cm)^{0.5}$, compound 4: 9.1 $(cal/cm)^{0.5}$.

The liquid crystal composite to which the compound in FIG. 7b is added is vibrated for 6 hours using an ultrasonic cleaner. The supernatant of this liquid crystal composite is made to make contact with an opening for injection in the display device LCD formed of the substrates SUB1 and SUB2, where electrodes and pixels are structured in the same manner as in the second embodiment, and then, the vacuum chamber gradually returns to normal pressure so that the liquid crystal is injected. The following steps, such as of pasting polarizing plates, are the same as in the second embodiment.

In the thus gained liquid crystal display device, there are no defects in the display due to short circuiting or the like, there is little aggregation of carbon nanotubes within the substrates, and excellent contrast can be achieved.

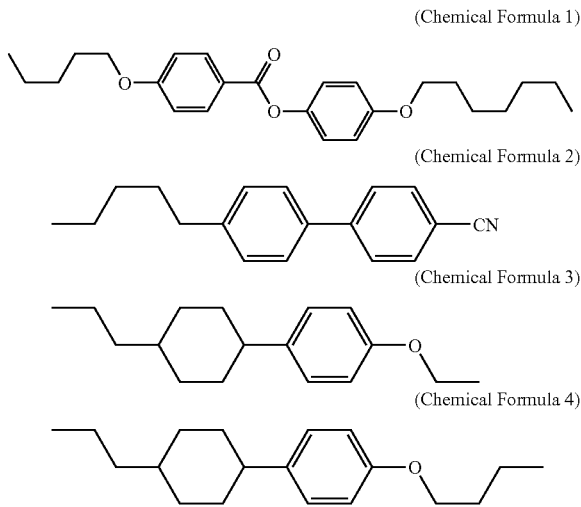

(Chemical Formula 1)
(Chemical Formula 2)
(Chemical Formula 3)
(Chemical Formula 4)

Here, excellent display can be achieved using any material having anisotropy in the uniaxial form other than carbon nanotubes. The structure and aggregation of molecules having anisotropy in the uniaxial form include "rod form," "columnar form," "cylindrical form" and "fiber form," and as examples of these structures, micelle structures in columnar form formed of amphipathic molecules, organic nanotubes in hollow fiber form, glucosamine based polymer nanotubes, phenol based polymer nanotubes and tobacco mosaic viruses can be cited, but the structure is not limited to these.

Fourth Embodiment

Carbon nanotubes (made by Aldrich Inc.) having an average length of 500 nm along the longitudinal axis are refined in accordance with Non-Patent Document 7 (Increasing Dispersion and Conductivity of Carbon Nanotubes, by Masato Sano, pp. 15 to 17, 2006) and Non-Patent Document 8 (Increasing Dispersion and Conductivity of Carbon Nanotubes, by Kazuyuki Taji, pp. 14 to 21, 2006). The present invention does not relate to a refining method or a synthesizing method, and therefore, the details are not given. In the present embodiment, carbon nanotubes are dispersed in 10% hydrogen peroxide/pure water, and after that reflux overheating stirring is carried out for approximately 3 hours in the air. The thus refined carbon nanotubes are collected using a filter and washed with pure water, and after that dried. They are then measured through Raman spectrometry in order to find whether the G-band appearing in the vicinity of 1593 $cm^{-1}$ becomes sharper, and the intensity of the D-band in the amorphous structure in the vicinity of 1350 $cm^{-1}$ and in the vicinity of 1600 $cm^{-1}$ becomes higher than before refinement.

$10^{-3}$ wt % of these carbon nanotubes is added to a liquid crystal material (ZLI 4792, made by Merck Ltd.) after refinement. After that, the material is vibrated for 6 hours using an ultrasonic cleaner, and the supernatant thereof is made to make contact with the opening for injection in the display device LCD formed of the substrates SUB1 and SUB2, where electrodes and pixels are structured in the same manner as in the second embodiment, and then, the vacuum chamber gradually returns to normal pressure so that the liquid crystal is injected. The following steps, such as of pasting polarizing plates, are the same as in the second embodiment.

In the thus gained liquid crystal display device, carbon nanotubes aggregate very little within the substrates, and excellent contrast can be achieved. Here, excellent display can be achieved using any material having anisotropy in the uniaxial form other than carbon nanotubes. The structure and aggregation of molecules having anisotropy in the uniaxial form include "rod form," "columnar form," "cylindrical form" and "fiber form," and as examples of these structures, micelle structures in columnar form formed of amphipathic molecules, organic nanotubes in hollow fiber form, glucosamine based polymer nanotubes, phenol based polymer nanotubes and tobacco mosaic viruses can be cited, but the structure is not limited to these.

Fifth Embodiment $10^{-5}$ wt %, $5 \times 10^{-5}$ wt %, $5 \times 10^{-4}$ wt % and $10^{-1}$ wt % of carbon nanotubes (made by Aldrich Inc.) having an average length of 500 nm along the longitudinal axis are added to a liquid crystal material (ZLI 4792, made by Merck Ltd.). These are respectively vibrated for 6 hours using an ultrasonic cleaner, and the supernatant thereof is made to make contact with the opening for injection in the display device LCD formed of the substrates SUB1 and SUB2, where electrodes and pixels are structured in the same manner as in the second embodiment, and then, the vacuum chamber gradually returns to normal pressure so that the liquid crystal is injected. The following steps, such as of pasting polarizing plates, are the same as in the second embodiment.

Figure 8:
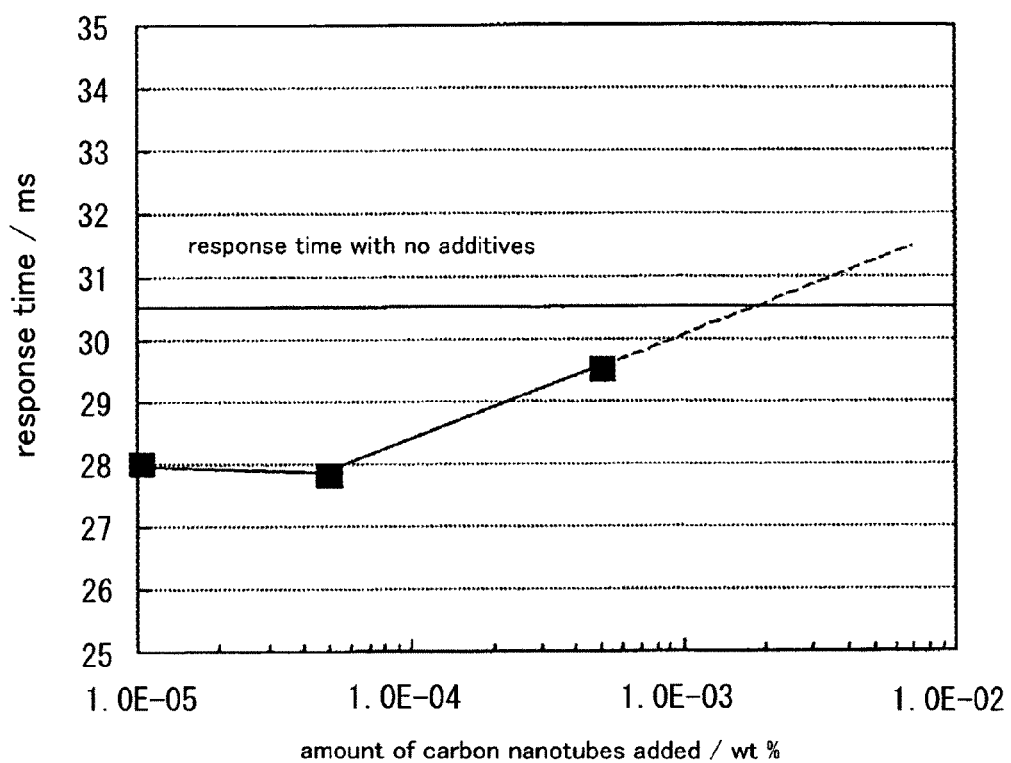
FIG. 8 is a graph showing the relationship between the amount of carbon nanotubes added and the response time.

In the thus gained liquid crystal display device, the response time is measured at 25° C. The results are shown in FIG. 8. As can be seen from this diagram, increase in the speed of the response time can be confirmed when carbon nanotubes are added as described in Non-Patent Document 4. The material to which $10^{-1}$ wt % is added, however, cannot be injected into the liquid crystal display device, due to heavy aggregation and precipitation of carbon nanotubes.

Figure 9A:
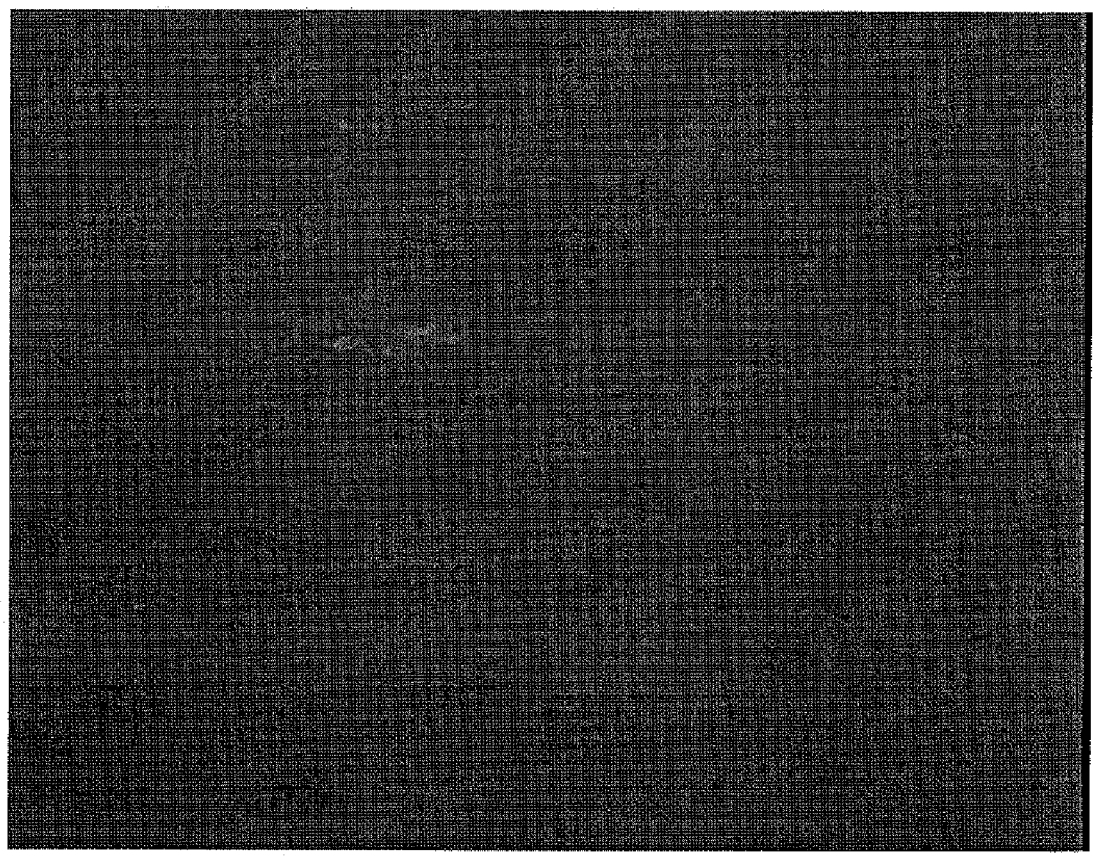
FIG. 9a is a photograph of a liquid crystal material to which 0 wt % of carbon nanotubes is added.
Figure 9B:
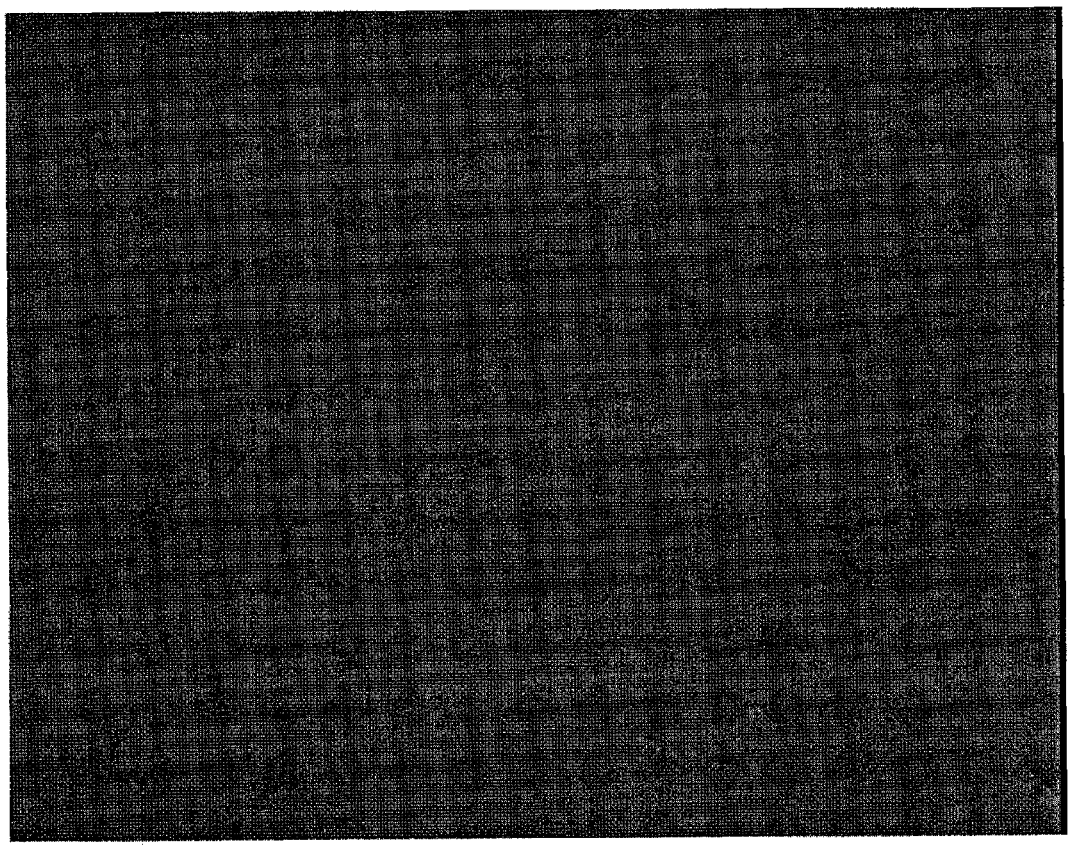
FIG. 9b is a photograph of a liquid crystal material to which $5 \times 10^{-4}$ wt % of carbon nanotubes is added.
Figure 9C:
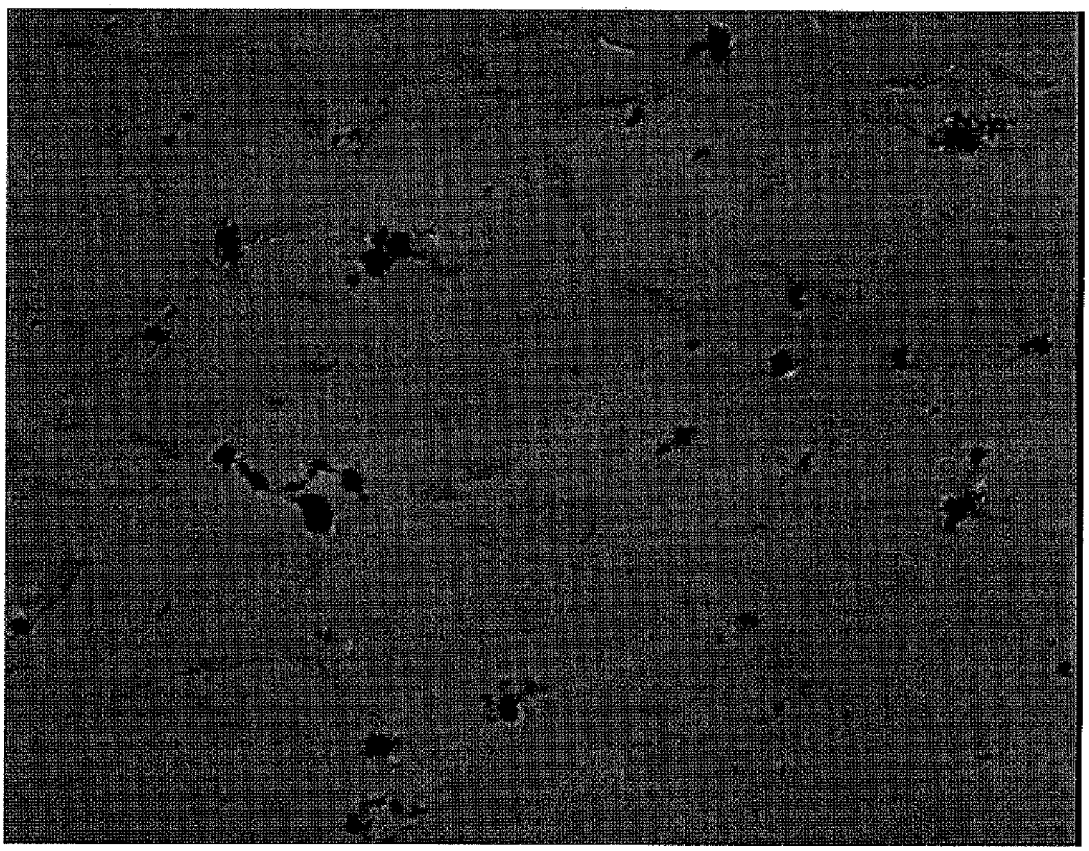
FIG. 9c is a photograph of a liquid crystal material to which $10^{-1}$ wt % of carbon nanotubes is added.

Here, the respective liquid crystal materials are observed using a polarizing microscope before being injected into the display device LCD. FIGS. 9a, 9b and 9c are photographs of the respective liquid crystal materials to which 0 wt %, $5 \times 10^{-4}$ wt % and $10^{-1}$ wt % of carbon nanotubes are added. As can be seen from these, the higher the concentration of carbon nanotubes is, the more carbon nanotubes aggregate. In particular, aggregate of 20 microns, which is greater than the height of the spacers in columnar form on SUB2, is created when $10^{-1}$ wt % is added, and thus carbon nanotubes are not dispersed uniformly. In addition, it becomes clear from this examination that the time for response increases as the amount added increases.

It is clear from the above described results concerning the aggregation of carbon nanotubes and increase in the time for response that the upper limit for the amount added is $10^{-1}$ wt %, desirably $10^{-2}$ wt %. In addition, the minimum time for response is exhibited when approximately $10^{-4}$ wt % of carbon nanotubes is added, and the response time becomes shorter as the concentration increases, up to in the vicinity of $10^{-4}$ wt %. Judging from this, effects of increase in the speed of response can be expected even when an extremely small amount of as little as $10^{-4}$ wt %, or less, of carbon nanotubes is added. Judging from the above, it is desirable for the amount of carbon nanotubes added to be greater than 0 wt %.

Meanwhile, in view of the control of the amount of carbon nanotubes added with precise scaling, it is desirable for the amount to be $10^{-7}$ wt % or more or $10^{-6}$ wt % or more. In this case, carbon nanotubes aggregate little, there is no change in the optical properties due to increase in the thickness of the liquid crystal layer caused by aggregate, and excellent contrast and high-speed response can be achieved. Here, excellent display can be achieved using any material having anisotropy in the uniaxial form other than carbon nanotubes. The structure and aggregation of molecules having anisotropy in the uniaxial form include "rod form," "columnar form," "cylindrical form" and "fiber form," and as examples of these structures, micelle structures in columnar form formed of amphipathic molecules, organic nanotubes in hollow fiber form, glucosamine based polymer nanotubes, phenol based polymer nanotubes and tobacco mosaic viruses can be cited, but the structure is not limited to these.

A method for confirming whether the liquid crystal material contains molecules with anisotropy in the uniaxial form is described below. First, the liquid crystal is filtered through a filter where the diameter of pores is small. At this time, it is desirable for the diameter of pores to be small, and a filter with pores of 0.2 μm, which is generally available, may be used. After that, the material is cleaned with an appropriate solvent and dried, and then molecules with anisotropy in the uniaxial form are separated. At this time, it may be necessary to separate a large amount, depending on the subsequent technique for analysis, and therefore, in some cases a large amount of liquid crystal material containing molecules with anisotropy in the uniaxial form is prepared.

The form and length of the separated molecules with anisotropy in the uniaxial form can be confirmed through observation using a transmission electron microscope. A method using light scattering is known as a method for measuring the diameter of nanoparticles, but the precision of measurement for particles having anisotropy in the form is not high, and therefore, it is desirable to confirm the length through observation using a transmission electron microscope, as described above.

Though the liquid crystal display device having a lateral electrical field system according to the first to fifth embodiments of the present invention can be implemented, reduction in the contrast due to inconsistency in the thickness of the liquid crystal layer or leaking of light from the peripheral portion of aggregate and short circuiting between electrodes due to carbon nanotubes are the same problems as in other display modes, such as vertical alignment (VA) systems, twisted nematic (TN) systems and electrical field control birefringence (ECB) systems. By adopting the configuration according to the present invention, excellent display performance can be achieved, irrespectively of whether the display system is VA, ECB, TN or the like.

The invention claimed is:

1. A liquid crystal display device, comprising:
   a first substrate;
   a second substrate; and
   a liquid crystal layer, a pixel electrode and a common electrode placed between said first substrate and said second substrate, wherein
   said liquid crystal layer contains organic particles having anisotropy in a uniaxial form,
   the longitudinal axis of said particles is no greater than the thickness of said liquid crystal layer or the distance between said pixel electrode and said common electrode—whichever is shorter,
   the amount of said particles contained in said liquid crystal is more than 0 wt % and no more than $10^{-1}$ wt %,
   carboxyl groups are bonded to the surface of said particles, and
   the surface of said particles is in an amorphous state.

2. A liquid crystal display device, comprising:
   a first substrate;
   a second substrate; and
   a liquid crystal layer, a pixel electrode and a common electrode placed between said first substrate and said second substrate, wherein
   said liquid crystal layer contains a number of organic particles having anisotropy in a uniaxial form,
   the longitudinal axis of the particle having the longest longitudinal axis from among said particles is no greater than the thickness of said liquid crystal layer or the distance between said pixel electrode and said common electrode—whichever is shorter,
   the amount of said particles contained in said liquid crystal is more than 0 wt % and no more than $10^{-1}$ wt %,
   carboxyl groups are bonded to the surface of said particles; and
   the surface of said particles is in an amorphous state.

3. The liquid crystal display device according to claim 1, characterized in that
   the amount of said particles contained in said liquid crystal is no less than $10^{-7}$ wt % and no more than $10^{-1}$ wt %.

4. The liquid crystal display device according to claim 1, characterized in that
   the amount of said particles contained in said liquid crystal is no less than $10^{-6}$ wt % and no more than $10^{-2}$ wt %.

5. The liquid crystal display device according to claim 1, characterized in that said particles are any of carbon nanotubes, micelle structures in columnar form formed of amphiphathic molecules, organic nanotubes in hollow fiber form, glucosamine based polymer nanotubes, phenol based polymer nanotubes and tobacco mosaic viruses.

6. The liquid crystal display device according to claim 1, characterized in that
   said common electrode is formed on said first substrate,
   a passive film is provided over said common electrode,
   said pixel electrode is provided on said passive film, and
   said pixel electrode is formed into comb-like form.

7. The liquid crystal display device according to claim 2, characterized in that
   the amount of said particles contained in said liquid crystal is no less than $10^{-7}$ wt % and no more than $10^{-1}$ wt %.

8. The liquid crystal display device according to claim 2, characterized in that
   the amount of said particles contained in said liquid crystal is no less than $10^{-6}$ wt % and no more than $10^{-2}$ wt %.

9. The liquid crystal display device according to claim 2, characterized in that said particles are any of carbon nanotubes, micelle structures in columnar form formed of amphiphathic molecules, organic nanotubes in hollow fiber form, glucosamine based polymer nanotubes, phenol based polymer nanotubes and tobacco mosaic viruses.

10. The liquid crystal display device according to claim 2, characterized in that
    said common electrode is formed on said first substrate,
    a passive film is provided over said common electrode,
    said pixel electrode is provided on said passive film, and
    said pixel electrode is formed into comb-like form.

* * * * *